United States Patent
Grant et al.

(10) Patent No.: US 6,242,970 B1
(45) Date of Patent: Jun. 5, 2001

(54) CHARGE-PUMP DEVICE AND METHOD OF SEQUENCING CHARGE-PUMP SWITCHES

(75) Inventors: David Grant, Dallas; Robert Martinez, Lucas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/389,809

(22) Filed: Sep. 4, 1999

(51) Int. Cl.[7] .................................................. G05F 3/02
(52) U.S. Cl. .................................... 327/536; 327/390
(58) Field of Search .................................. 327/536, 537, 327/390, 589; 307/110

(56) References Cited

U.S. PATENT DOCUMENTS

| | | | |
|---|---|---|---|
| 4,679,134 | * | 7/1987 | Bingham et al. ............... 307/110 |
| 4,797,899 | * | 1/1989 | Fuller et al. ................... 307/110 |
| 5,051,881 | * | 9/1991 | Herold .......................... 327/536 |
| 5,397,928 | * | 3/1995 | Chan et al. ................... 327/536 |
| 5,606,491 | * | 2/1997 | Ellis ............................. 363/60 |
| 5,699,313 | * | 12/1997 | Foss et al. .................... 327/589 |
| 5,955,895 | * | 9/1999 | Tomazini et al. ............. 327/536 |

* cited by examiner

Primary Examiner—Terry D. Cunningham
(74) Attorney, Agent, or Firm—Pedro P. Hernandez; W. James Brady, III; Frederick J. Telecky, Jr.

(57) ABSTRACT

Provided is a method of operating a charge-pump, which may be implemented in IC devices such as digital signal processors (DSPs) and mixed signal analog circuits. The method includes the steps of charging a first capacitor, and then choosing between two switching sequences based on the relative values of the input voltage and the output voltage. When the input voltage is determined to be greater than the output voltage, the method applies a first switching sequence to discharge the first capacitor into a second capacitor by first partially discharging the first capacitor into the second capacitor, then fully discharging the first capacitor into the second capacitor. When the input voltage is determined to be less than or equal to the output voltage, the method uses a second switching sequence to prevent the discharge of the second capacitor into the first capacitor by electrically isolating the first capacitor.

16 Claims, 2 Drawing Sheets

CHARGE-PUMP DEVICE AND METHOD OF SEQUENCING CHARGE-PUMP SWITCHES

CROSS REFERENCE TO RELATED APPLICATIONS

Cross reference is made to the following patent applications, each assigned to the same assignee, the teachings of which are incorporated herein by reference:

| Patent No. | Serial No. | Filing Date | Inventor | Title |
|---|---|---|---|---|
| TBD | 09/389,811 | Herewith | Grant | Integration of Synchronous Rectifier Restoration of Boot Capacitor into Charge-Pump |
| TBD | 09/389,691 | Herewith | Grant | Charge-Pump Closely Coupled to Switching Converter to Improve Area Efficiency |
| TBD | 09/389,810 | Herewith | Martinez et al | Controlled Linear Start-Up in a Linear Regulator |

TECHNICAL FIELD OF THE INVENTION

This invention relates generally to integrated circuits, more specifically to a charge-pump device and a method of dynamically sequencing charge-pump switches to improve the efficiency of a charge-pump circuit.

BACKGROUND OF THE INVENTION

As integrated circuits (ICs), such as digital signal processors (DSPs) and mixed signal analog circuits, are required to operate at faster speeds, and continue to be designed and built smaller, more electrical power is used per unit of wafer surface area. Using more electrical power per unit of wafer surface area causes the operating temperature of ICs to increase. Since the power consumed by a device is a function of the current flowing through the IC and the upon the voltage placed across the IC, lower working voltages are sometimes implemented to lower the power used by the IC.

Likewise, as overall system sizes have continued to decrease, power supply designs with smaller sizes and higher efficiencies are used to supply power to these smaller circuits that operate at lower voltages. Switch mode power supplies (also known as direct current (DC) to DC converters, are typically used in electrical devices, such as digital signal processors (DSPs) and mixed signal analog circuits. These devices are commonly used in products such as modems, television receivers and cell phones, for example. DC to DC converters convert the voltage of a primary source (such as a device battery) to the operating voltage required by the electrical circuitry or IC of the electrical device. Likewise, it is often necessary to re-convert the voltage of the electrical device from the voltage of the electrical circuitry or IC to a higher operating voltage used by the device. For instance, a 2.8 volt supply voltage provided to a BiCMOS IC may need to be increased internally to 5.0 volts to operate internal CMOS circuitry. Sometimes, a charge-pump is used to generate a larger power supply voltage from a smaller one.

Unfortunately, the performance of a charge-pump is not very efficient during the charge-up period of the charge-pump. In addition, during the charge-up period, an IC coupled to the charge-pump may be damaged due to an over-voltage condition.

Also, the performance of charge-pumps is limited due to the time it takes to charge-up the charge-pump. Furthermore, if the output voltage of the charge-pump exceeds it's input voltage, the charge-pump may forward bias back diodes and inject noise into the IC. All of these factors contribute to reducing the efficiency of the charge-pump.

Therefore it is desired to have a charge-pump circuit and a method for implementing a charge-pump that increases start-up speed, increases charge-pump efficiency, prevents over-voltage conditions, and reduces the likelihood of noise injection. The present invention provides such a device and method.

SUMMARY OF THE INVENTION

The present invention achieves technical advantages as a charge-pump and a method of operating a charge-pump that has one switching sequence for the start-up operation of the charge-pump, and a second switching sequence for the steady-state operation of the charge-pump. This dual-mode switching sequence provides advantages over charge-pumps that are designed to charge-up and operate using the same switching sequence that is typically based on the charge-pump's steady state (non charge-up) operation. Accordingly, the charge-pump of the present invention provides the advantages of better start-up speeds, increased charge-pump efficiency, the prevention of over-voltage conditions, and the reduced likelihood of noise injection.

The invention comprises a method of operating a charge-pump. The method includes the steps of charging a first capacitor, and then choosing between two switching sequences based on the determined relative values of the input voltage and the output voltage of the charge pump. When the input voltage is greater than the output voltage, the method applies a first switching sequence to discharge the first capacitor into a second capacitor by first partially discharging the first capacitor into the second capacitor, then fully discharging the first capacitor into the second capacitor. When the input voltage is determined to be less than or equal to the output voltage, the method uses a second switching sequence to prevent the discharge of the second capacitor into the first capacitor by electrically isolating the first capacitor.

The invention further comprises a charge-pump configuration. The charge-pump configuration includes an input voltage defined as the voltage between a first node and a connection to ground, as well as an output voltage defined as the voltage between a fifth node and a connection to ground. The charge-pump has several switches, including a first switch coupled between the first node and a second node, a second switch coupled between the first node and a third node, a third switch coupled between the third node and the connection to ground, and a fourth switch coupled between the second node and the fifth node. Furthermore, the charge-pump includes a first capacitor coupled between the second node and the third node, and a second capacitor coupled between the fifth node and the connection to ground.

Using the invention, one method of operating the charge-pump includes sequentially charging a first capacitor by closing the first switch, closing the third switch, opening the second switch, and opening the fourth switch. The method then applies a first switching sequence comprising the steps of sequentially closing the fourth switch to partially discharge the first capacitor into the second capacitor in a first sub-step, and then opening the third switch to isolate the first capacitor from the ground connection in a second sub-step. Then, in a third sub-step the method closes the second switch to fully discharge the first capacitor into the second capacitor. The method also uses a second switching sequence comprising the steps of sequentially opening the third in a first sub-step, closing the fourth switch in a second sub-step, and closing the second switch in a third sub-step. The first switching sequence is selected when an output voltage is determined to be less than an input voltage, and the second switching sequence is selected when an output voltage is determined to be greater than or equal to an input voltage.

The invention allows the implementation of NMOS transistors for the first or the third switch, and PMOS transistors for the second switch or the fourth switch. The first capacitor could be a 1 uF (micro-farad) capacitor. Likewise, the second capacitor could be a 10 uF capacitor.

In another aspect, the present invention is a method of operating a charge-pump during charge-up. Using the disclosed charge-pump, the method comprises the steps of closing the first switch, closing the third switch, opening the second switch, and opening the fourth switch to charge the first capacitor in a first sub-step. Then, the method proceeds by closing the fourth switch to partially discharge the first capacitor into the second capacitor in a second sub-step. Afterwards, the third switch is opened to isolate the first capacitor from ground in a third sub-step. Lastly of these sub-steps, the method closes the second switch to fully discharge the first capacitor into the second capacitor. This method is designated for use particularly when the output voltage that is less than the input voltage.

BRIEF DESCRIPTION OF THE DRAWINGS

Other aspects of the invention, including alternative embodiments, are understood by reference to the following Detailed Description of a Preferred Embodiment, which can be better understood by reference to the drawings, in which.

DETAILED DESCRIPTION OF A PREFERRED EMBODIMENT

The present invention provides a charge-pump and a method of operating the charge-pump that provide better start-up speeds, increased charge-pump efficiency, prevents over-voltage conditions, and reduces the likelihood of noise injection. The present invention comprises a charge-pump operating in two states—a first state, also called the start-up operation, where an output voltage is raised to a target voltage, and a second state, also called the steady-state operation, where an output voltage is maintained at a target voltage. Accordingly, the present invention takes advantage of the two states by using one switching sequence for the start-up operation of the charge-pump, and a second switching sequence for the steady-state operation of the charge-pump. This provides advantages over charge-pumps that are designed to charge-up and operate using one only switching sequence.

Figure 1:
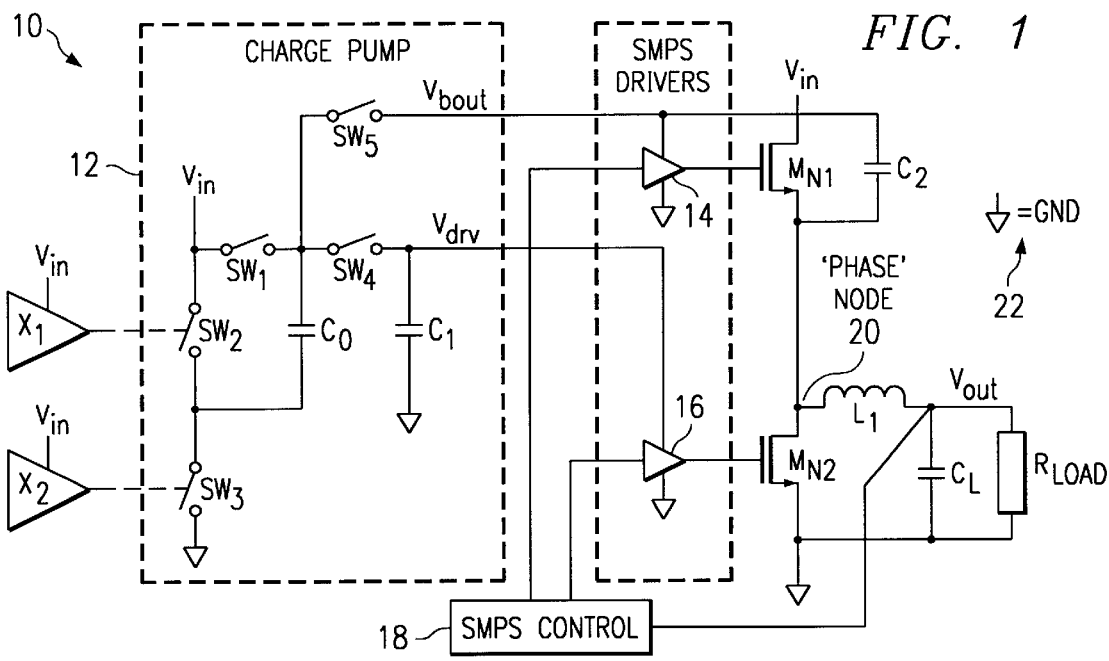
FIG. 1 is a block diagram of a switch mode converter powered from a charge-pump.

The charge-pump of the present invention may be implemented in a number of IC devices, such as digital signal processors (DSPs) and mixed signal analog circuits such as switch mode converters. FIG. 1 illustrates a block diagram of a switch mode converter 10 powered from a charge-pump 12 of the present invention. The charge-pump 12 runs from an internal oscillator (not shown), until the capacitors $C_1$ and $C_2$ are fully charged. Once both capacitors $C_1$ and $C_2$ are charged, the main switch mode converter is started.

One implementation of the charge pump 12 could be used in association with a switch mode power converter, as discussed in related application entitled "INTEGRATION OF SYNCHRONOUS RECTIFIER RESTORATION OF BOOT CAPACITOR INTO CHARGE-PUMP" by Grant, assigned to the same assignee of the present invention and the teachings of which are incorporated herein by reference.

Controller 18 alternately turns MOS transistors $MN_1$ and $MN_2$ on, causing a voltage of a phase node 20 to swing between 0V and $V_{in}$. The phase node 20 is tied to one end of capacitor $C_2$. The other end of capacitor $C_2$ provides the power supply for a driver 14 driving the gate of MOS transistor $MN_1$. When transistor $MN_1$ begins to turn on, the voltage of phase node 20 rises, correspondingly increasing the drive voltage for transistor $MN_1$. The charge required to turn on transistor $MN_1$ is supplied from capacitor $C_2$ When controller 18 turns transistor $MN_1$ off and transistor $MN_2$ on, the voltage of phase node 20 is brought down to 0V and capacitor $C_2$ is recharged.

Figure 2:
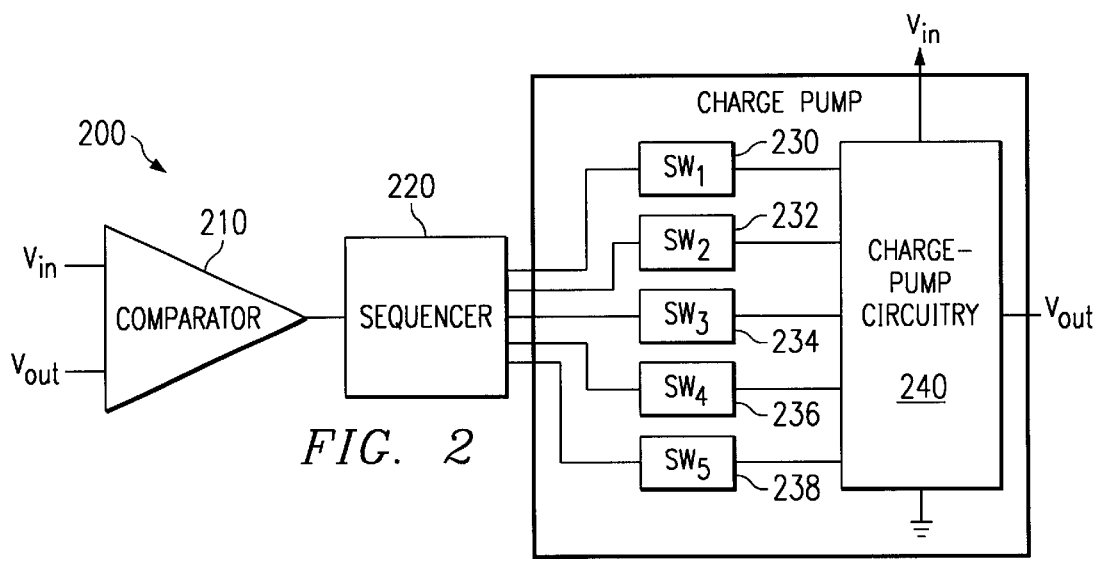
FIG. 2 is a block-diagram of a charge-pump designed according to the teachings of the present invention.

FIG. 2 is a block diagram of an IC sub-component 200 configured to control the charge-pump. Generally, the IC sub-component 200 is responsible for generating the control signals for opening and closing the charge pump switches (SW1 230, SW2 232, SW3 234, SW4 236) in a pre-defined pattern (switch sequence). The present invention implements at least two distinct switching sequences based on the relative values of two monitored voltages, the output voltage ($V_{out}$) and the input voltage ($V_{in}$). The IC sub-component 200 implements one of the two switching sequences for the attached charge-pump as a function of the compared voltages.

$V_{in}$ and $V_{out}$ are connected to the inputs of a comparator 210. The comparator 210, typically implemented with transistors, such as FET, BIT, NMOS or PMOS transistors, or implemented through other circuitry, compares the relative values of $V_{out}$ and $V_{in}$. The comparitor 210 has an output, typically a discrete digital output signal, which indicates to the sequencer 220 whether $V_{out}$ is less than or equal to $V_{in}$, or whether $V_{out}$ is greater than $V_{in}$. For example, the comparator 210 may compare $V_{out}$ to $V_{in}$, and determine that $V_{out}$ is less than $V_{in}$. Then, the comparator 220 responsively generates an output signal of approximately zero volts (0V) (assuming that 0V has been assigned to designate a logical 0) to the sequencer 220. Likewise, if $V_{out}$ is determined to be greater than $V_{in}$, the comparator 210 responsively generates an output voltage of greater than 0V (typically 2.5, 3.3 or 5 volts, assuming that a higher than 0V signal has been chosen to represent a logical 1) to the sequencer 220. However, it should be noted that the actual output voltage of the comparitor 210 will depend on the type of IC structures chosen to implement the sequencer 220. The logic of the comparator is typically implemented directly on the IC structure. Also, the logic could also be implemented off of an IC via an external device.

The sequencer 220 responsively receives the output signal of comparator 210 and generates one of two predetermined switching sequences based on the signal received from the comparator 210. Of course, additional signals may be sent to the sequencer 220, and more than two switching sequences may be implemented by sequencer 220 based on any combination of inputs if desired. The sequencer contains the circuitry generating the switching sequences, which could be implemented as time-delay capacitors and resistors and logic gates, and is typically implemented directly on the IC structure. However, as is the case with the comparator 2 10, the sequencer 220 logic could also be implemented via an external device.

The sequencer 220 responsively generates signals in the corresponding sequence to open and close corresponding switches 230, 232, 234, and 236 by either placing a voltage associated with a logical 1 or a logical 0 on the output line connected to a control terminal of specific switch (the actual value of the output voltage, and the logic used will depend on the type of logic device used to implement the switch). Accordingly, if switch one (SW1) 230 is implemented as an NMOS transistor, the SW1 will be closed when the sequencer 220 places a higher than zero voltage (logical 1) to the gate of switch 230. Likewise, if switch two (SW2) 232 is a PMOS transistor, the sequencer 220 will close the second switch 232 by placing a low voltage (logical 0) to the gate of the second switch 232. Although four switches are shown, more switches or fewer switches may be used to implement a charge pump according to the teachings of the present invention. Also, switching may be implemented using any logical switching device, such as BJTs, FETs, or other logical switching devices, for example. Furthermore, the switches may be implemented directly on the IC substrate, or off of the IC subsubstrate in an external device.

Charge-pump circuitry 240 operates in two phases—the start-up operation and the steady state operation. By opening and closing the switches 230, 232, 234 and 236 in the first selective sequence, charge-pump circuitry 240 is able to increase the output voltage $V_{out}$ by stepping-up from the input voltage to the desired target voltage in a first phase, start-up operation. Likewise, by opening and closing the switches 230, 232, 234 and 236 in the second selective sequence, charge-pump circuitry 240 is able to maintain the output voltage at the target voltage in a second phase, steady-state operation. More specifically, the charge-pump circuitry 240 operates in the first phase when $V_{out}$ is less than or equal to $V_{in}$, and likewise, the charge-pump circuitry 240 operates in the second phase when $V_{out}$ is greater than $V_{in}$.

Figure 3:
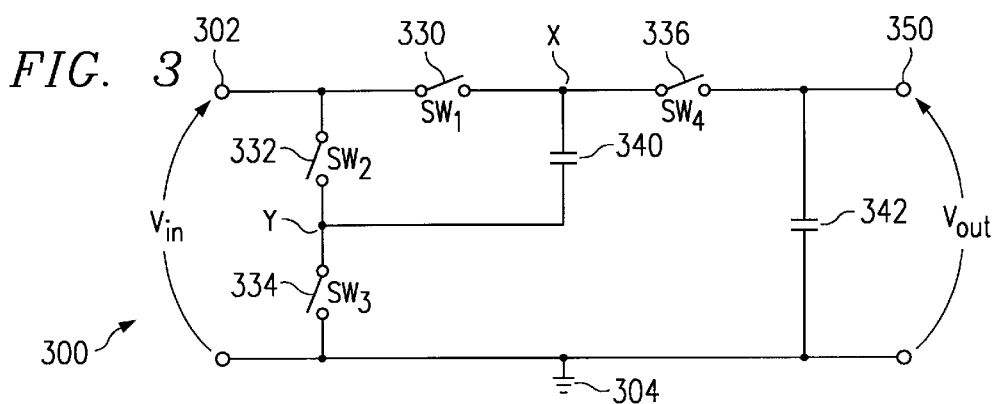
FIG. 3 shows a simplified block-circuit diagram of the charge-pump.

FIG. 3 shows a simplified block-circuit diagram of a charge-pump 300 according to the present invention. The charge-pump 300 comprises an input node 302 connected to a first switch 330 and a second switch 332. The first switch 330 controls current flow between the first node 302 and a node X, and the second switch 332 controls current flow between the input node 302 and a node Y. The charge-pump 300 has a third switch 334 for controlling current flow between the node Y and a connection to ground 304, and a fourth switch 336 for controlling current flow between the node X and an output node 350. A first capacitor 340 is coupled between the node Y and the node X. The first capacitor 340 is charged up to the input voltage ($V_{in}$) by connecting node X to Vin by closing first switch 230 and connecting node Y to ground (0V) by closing third switch 334. Then, by opening second switch 332 and third switch 334 node Y is raised from ground (0V) to $V_{in}$, and node X correspondingly rises from $V_{in}$ to $2 \times V_{in}$. If fourth switch 336 is closed and the voltage on $V_{out}$ is less than $2 \times V_{in}$, charge flows from the first capacitor 340 into the second capacitor 342. In this process, the voltage across the first capacitor 340 reduces and the voltage across the second capacitor 342 ($V_{out}$) increases. By this means, the charge-pump 300 maintains a higher voltage $V_{out}$ than the input voltage $V_{in}$. The charge-pump second capacitor 342 is connected between the output node 350 and the connection to ground 304 such that the voltage across the second capacitor 342 defines the output voltage ($V_{out}$). Similarly, the input voltage ($V_{in}$) is defined as the voltage between the input node 302 and the connection to ground 304.

Figure 4:
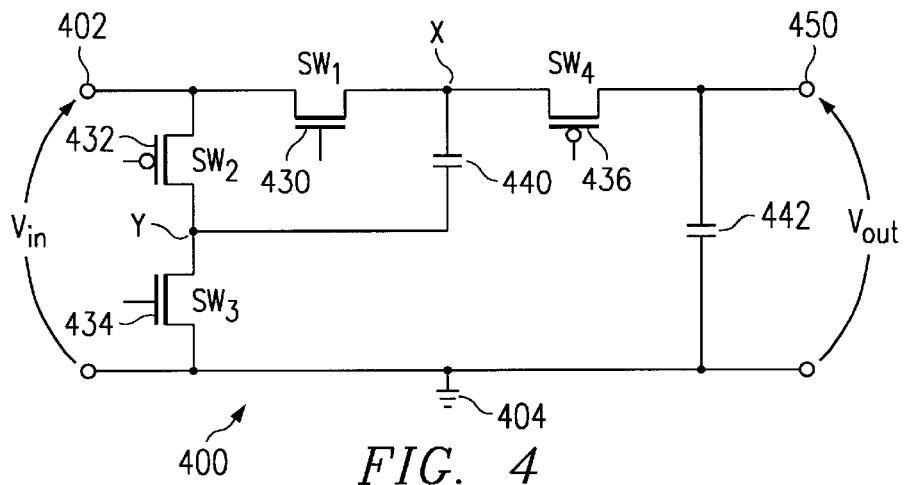
FIG. 4 is a circuit diagram design of the charge-pump implemented with metal oxide semiconductor (MOS) transistor technology.

FIG. 4 is a circuit diagram of a charge-pump 400 implemented with metal oxide semiconductor (MOS) technology. Similar to the charge-pump 300 of FIG. 3, the charge-pump 400 has an input node 402 that is coupled to a first switch (which is implemented as a NMOS transistor) and that is coupled to a second switch 432 (which is implemented as a PMOS transistor). Although not illustrated in FIG. 4, the gates of each MOS device are driven by the sequencer 200. The first switch 430 is then coupled to node X, and the second switch 432 is coupled to node Y.

A first capacitor 440 is coupled between the node Y and the node. The third switch 434, which is shown as an NMOS transistor, controls current flow between node Y and the connection to ground 404. Accordingly, an input voltage ($V_{in}$) is defined as the voltage between the input node 402 and the connection to ground 404. A fourth switch 436 is shown implemented as PMOS transistor and is coupled between node X and an output node 450. A second capacitor 442 is shown connected between the output node 450 and the connection to ground 404, and the voltage across the second capacitor 442 defines $V_{out}$. The charge-pump 400 can be implemented directly upon an IC, or built and operated via an external device. The advantages of the present invention are realized by selectively implementing different timing sequences in the switches 430, 432, 434 and 436 depending on the state of operation of the charge-pump 400 as indicated by the output of comparator 210.

Figure 5:
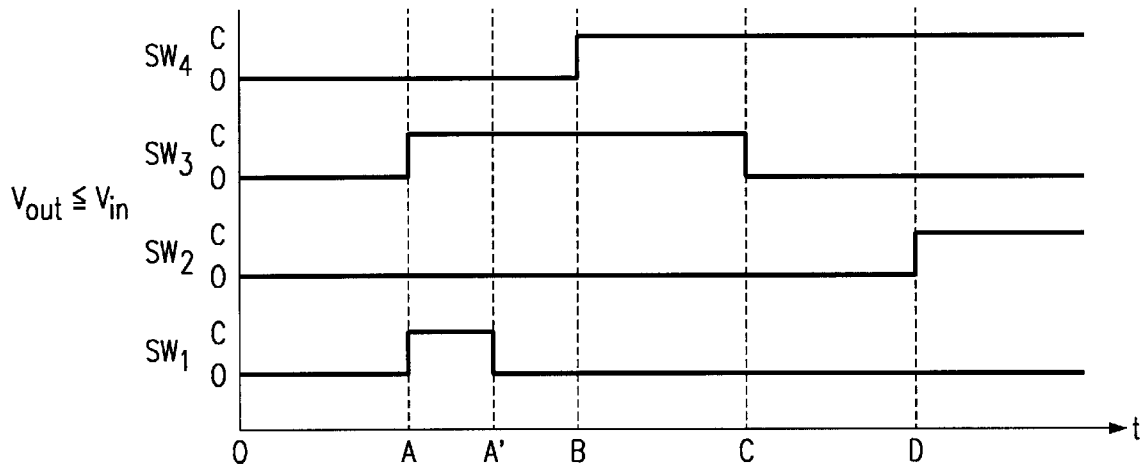
FIG. 5 is a timing diagram illustrating the multiple switching sequences preferred for optimal operation of the charge-pump during start-up operation.
Figure 6:
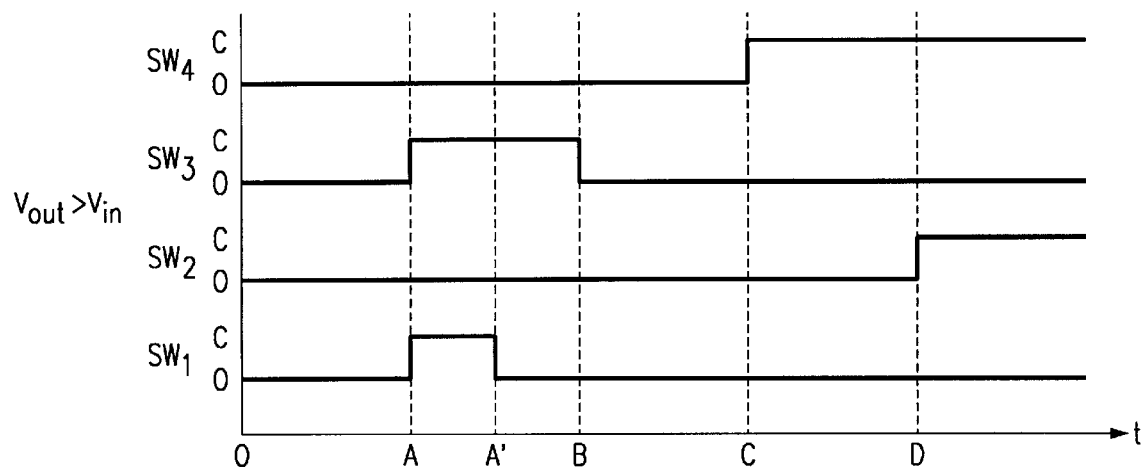
FIG. 6 is a timing diagram illustrating the multiple switching sequences preferred for optimal operation of the charge-pump during steady-state operation.

FIG. 5 is a timing diagram illustrating the first of two switching sequences. the first switching sequence, illustrated as a timing diagram in FIG. 5, is applied during the start-up operation of the charge-pump 300 and 400. A second switching sequence, illustrated as a bottom timing diagram in FIG. 6, is applied during the steady-state operation of the charge-pump 300 and 400. Each switching sequence is designed to take advantage of the characteristics of the charge-pump during its respective phase. Accordingly, the efficiency of the charge pump is improved and ramp-up time is reduced.

More specifically, FIG. 5 illustrates the first of the switching sequences for the conditon where $V_{out}$ is determined to be less than or equal to $V_{in}$. FIG. 6 illustrates the second of the switching sequences for the condition and where $V_{out}$ is greater than $V_{in}$. In both diagrams, time-dependent events are indicated along the horizontal axis, where each event is identified by a capital letter A, A', B, C & D. Although each event, A through D, is order dependent, in no way should the timing diagram be construed as requiring that the events happen at specific relative times. For example, the time between event A and event B maybe the same, greater than, or less than the time between event B and event C or the time between event C and event D, etc. The individual switches are identified up the vertical axis. The state of the switch (either opened or closed) is indicated by an event line corresponding to an O for "Opened" or a C for "Closed." Accordingly, when a switch's event line corresponds to the switch's O position, that switch is open. Likewise, when the switch's event line corresponds to that switch's C position, that switch is closed.

Turning to the specific switch sequences, and with respect to charge pump 400 shown in FIG. 4, in the case where $V_{out}$ is less than or equal to $V_{in}$, as shown in FIG. 5, initially, each switch is open at a time t=0. All switches remain open after t=0 until the charge-pump begins operation at time t=A. At time t=A switch one 430 and switch three 434 both close a predetermined period allowing current to flow into the first capacitor 440 until the first capacitor 440 is charged, then, the next event A' occurs at t=A'. At T=A', switch one 430 opens a predetermined time period. Then, the charge-pump 400 discharges the first capacitor 440 into the second capacitor 442, another event B takes place at time t=B. At time t=B, switch four 436 closes a predetermined time period, allowing the first capacitor 440 to partially discharge into the second capacitor 442. Next, at time t=C the next event C takes place, which is the switching of switch three 434 from the closed position to the open position a predetermined period, thus isolating the first capacitor 440. Next, to fully discharge the first capacitor 440 into the second capacitor 442, the second switch 432 is closed a predetermined period. This is defined as the first switching sequence, which is implemented during the first state, or during charge-up operation.

The timing diagram of FIG. 6 illustrates the second switching sequence which is implemented when the charge-pump 400 is in the second state, or steady-state operation. At time t=0 all switches 430, 432, 434 and 436 are placed in the open position. Then, a first event A takes place at time t=A where switch three 434 and switch one 430 close to charge the first capacitor 440. Then, at time t=A' a second event A' takes place where switch one 430 returns to the open position, and switch three 434 remains closed to maintain the charge on the first capacitor 440. Next, and a predetermined time later, at time t=B, switch three 434 opens thus isolating the first capacitor 440 as event B. Then, at time t=C switch four 436 closes, which forces node Y to change to a voltage level equal to the output voltage ($V_{out}$) minus the input voltage ($V_{in}$). This isolation prevents the discharging of the second capacitor 442 into the first capacitor 440, which could reduce the efficiency of the charge-pump 400. Then, at time t=D switch two 432 closes, which defines event D. These switch positions are maintained until the charge-pump 400 begins another phase.

Though the invention has been described with respect to a specific preferred embodiment, many variations and modifications will become apparent to those skilled in the alt upon reading the present application. It is therefore the intention that the appended claims be interpreted as broadly as possible in view of the prior alt to include all such variations and modifications.

We claim:

1. A method of operating a charge-pump having a plurality of switches comprising the steps of:
   charging a first capacitor;
   applying a first switching sequence to said switches to discharge the first capacitor into a second capacitor by first discharging the first capacitor into the second capacitor to a first level in a first sub-step of the first switching sequence and then discharging the first capacitor into the second capacitor to a second level in a second sub-step of the first switching sequence;
   applying a second switching sequence to said switches, said second switching sequence being different from said first switching sequence, to prevent the discharge of the second capacitor into the first capacitor; and
   wherein the step of applying the first switching sequence is selected when an output voltage of the charge-pump is less than an input voltage of the charge-pump, and the step of applying the second switching sequence is selected when an output voltage of the charge-pump is greater than or equal to an input voltage of the charge-pump.

2. The method of claim 1 wherein the step of applying the first switching sequence partially discharges the first capacitor into the second capacitor, then fully discharging the first capacitor into the second capacitor.

3. The method of claim 1 wherein the method uses the charge-pump comprising:
   an input voltage of the charge-pump defined as the voltage between a first node and a connection to ground, a first switch coupled between the first node and a second node, a second switch coupled between the first node and a third node, a third switch coupled between the third node and the connection to ground, a fourth switch coupled between the second node and a fifth node, an output voltage of the charge-pump defined as the voltage between the fifth node and the connection to ground, the first capacitor coupled between the second node and the third node, and the second capacitor coupled between the fifth node and the connection to ground.

4. The method of claim 3 wherein the step of charging the first capacitor comprises the sequential steps of:
   closing the first switch, closing the third switch, opening the second switch, and opening the fourth switch.

5. The method of claim 3 wherein the step of applying the first switching sequence comprises the sequential steps of:
   closing the fourth switch to partially discharge the first capacitor into the second capacitor in a first sub-step;
   opening the third switch to isolate the first capacitor from the ground connection in a second sub-step; and
   closing the second switch to fully discharge the first capacitor into the second capacitor.

6. The method of claim 3 wherein the step of using the second switching sequence comprises the sequential steps of:
   opening the third in a first sub-step;
   closing the fourth switch in a second sub-step; and
   closing the second switch in a third sub-step.

7. The charge-pump of claim 5 wherein the second capacitor is a 10 uF capacitor.

8. A charge-pump circuit, comprising:
   a charge pump including:
      an input voltage defined as the voltage between a first node and a connection to ground;
      a first switch coupled between the first node and a second node;
      a second switch coupled between the first node and a third node;
      a third switch coupled between the third node and the connection to ground;
      a fourth switch coupled between the second node and a fifth node;
      an output voltage defined as the voltage between the fifth node and the connection to ground;
      a first capacitor coupled between the second node and the third node; and a second capacitor coupled between the fifth node and the connection to ground;

a comparator for comparing the input voltage to the output voltage; and a sequencer responsive to the comparator for applying a first switching sequence to said switches to discharge the first capacitor into the second capacitor and applying a second switching sequence to said switches, said second switching sequence being different from said first switching sequence, to prevent the discharge of the second capacitor into the first capacitor.

9. The charge-pump of claim 8 wherein the first switch is a NMOS transistor.

10. The charge-pump of claim 8 wherein the second switch is a PMOS transistor.

11. The charge-pump of claim 8 wherein the third switch is a NMOS transistor.

12. The charge-pump of claim 8 wherein the fourth switch is a PMOS transistor.

13. The charge-pump of claim 8 wherein the first capacitor is a 1 uF capacitor.

14. The charge pump circuit of claim 8, wherein the first switching sequence is applied by first partially discharging the first capacitor into the second capacitor in a first substep of the first switching sequence and then fully discharging the first capacitor into the second capacitor in a second substep of the first switching sequence.

15. A method of operating a charge-pump, the charge pump comprising:

an input voltage of the charge pump defined as the voltage between a first node and a connection to ground, a first switch coupled between the first node and a second node, a second switch coupled between the first node and a third node, a third switch coupled between the third node and the connection to ground, a fourth switch coupled between the second node and a fifth node, an output voltage of the charge pump defined as the voltage of the charge pump between the fifth node and the ground connection, a first capacitor coupled between the second node and the third node, and a second capacitor coupled between the fifth node and the connection to ground; the method comprising the sequential steps of:

closing the first switch, closing the third switch, opening the second switch, and opening the fourth switch to charge the first capacitor in a first sub-step;

opening the first switch in a second sub-step;

closing the fourth switch to discharge the first capacitor into the second capacitor to a first level in a third sub-step;

opening the third switch to isolate the first capacitor from ground in a fourth sub-step; and closing the second switch to discharge the first capacitor into the second capacitor to a second level in a fifth sub-step.

16. The method of claim 15 further comprising the step of detecting the state where the output voltage of the charge-pump is less than the input voltage of the charge pump.

* * * * *